(12) United States Patent
Mimatsu et al.

(10) Patent No.: US 7,415,586 B2
(45) Date of Patent: *Aug. 19, 2008

(54) DATA BACKUP METHOD AND SYSTEM

(75) Inventors: Yasuyuki Mimatsu, Yokohama (JP); Yoshiaki Eguchi, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/295,662

(22) Filed: Dec. 7, 2005

(65) Prior Publication Data

US 2006/0085613 A1 Apr. 20, 2006

Related U.S. Application Data

(63) Continuation of application No. 10/650,858, filed on Aug. 29, 2003, now Pat. No. 7,013,373.

(30) Foreign Application Priority Data

Jul. 7, 2003 (JP) ............... 2003-192556

(51) Int. Cl.
   *G06F 12/16* (2006.01)
(52) U.S. Cl. ..................... 711/162; 711/114
(58) Field of Classification Search ........ None
   See application file for complete search history.

(56) References Cited

U.S. PATENT DOCUMENTS

| | | | |
|---|---|---|---|
| 6,205,450 B1 | 3/2001 | Kanome | |
| 6,691,245 B1 | 2/2004 | DeKoning | |
| 6,694,413 B1 | 2/2004 | Mimatsu et al. | |
| 6,851,020 B2 | 2/2005 | Matsumoto et al. | 711/112 |
| 6,886,075 B2 | 4/2005 | Yagisawa et al. | 711/114 |
| 6,886,086 B2 * | 4/2005 | Kobayashi et al. | 711/162 |
| 7,020,734 B2 * | 3/2006 | Mimatsu et al. | 710/311 |
| 7,047,354 B2 * | 5/2006 | Yagisawa et al. | 711/112 |
| 2003/0131278 A1 | 7/2003 | Fujibayashi | |
| 2004/0093474 A1 | 5/2004 | Lin et al. | |
| 2004/0168034 A1 | 8/2004 | Homma et al. | |
| 2004/0186900 A1 | 9/2004 | Nakano et al. | |

FOREIGN PATENT DOCUMENTS

EP    1148416 A2    10/2001

(Continued)

OTHER PUBLICATIONS

Standard ECMA-13, 4th Edition, Dec. 1985, pp. 7-19.

*Primary Examiner*—Denise Tran
(74) *Attorney, Agent, or Firm*—Mattingly, Stanger, Malur & Brundidge, P.C.

(57) ABSTRACT

A disk array has storage regions provided to store the management information for each disk volume of the backup data, and an interface is provided through which the management information for each disk volume is read from and written in by an external computer so that the backup data of disk volumes can be associated with the management information. The management information includes backup creation date and time, and content identifier, and it is set from the external computer, and updated according to the operations such as restore and tape copy based on the command from the external computer.

3 Claims, 14 Drawing Sheets

FOREIGN PATENT DOCUMENTS

| | | |
|---|---|---|
| JP | 6-309209 | 11/1994 |
| JP | 2001356945 | 12/2001 |
| JP | 2002-149461 | 5/2002 |
| JP | 2002196989 | 7/2002 |
| JP | 2002-278706 | 9/2002 |
| JP | 2002358245 | 12/2002 |
| JP | 2003-022208 | 1/2003 |
| JP | 200350675 | 2/2003 |
| JP | 2003058409 | 2/2003 |

* cited by examiner

FIG.3

17 PORT CORRESPONDENCE TABLE

| MOUNT POINT (171) | DEVICE FILE (172) | FC Port Addr. (173) | LUN (174) |
|---|---|---|---|
|  |  |  |  |
|  |  |  |  |
|  |  |  |  |
|  | ⋮ |  |  |

FIG.4

25 BACKUP VOLUME TABLE

| HOST COMPUTER NAME (251) | MOUNT POINT (252) | DEVICE ID (253) | Vol. NUMBER LIST (254) |
|---|---|---|---|
|  |  |  |  |
|  |  |  |  |
|  |  |  |  |
|  | ⋮ |  |  |

FIG.5 26 BACKUP DEFINITION TABLE

| 261 | 262 | 263 | 264 | 265 | 266 | 267 | 268 |
|---|---|---|---|---|---|---|---|
| HOST COMPUTER NAME | MOUNT POINT | BACKUP CLASSIFICATION | BACKUP DESTINATION | PREPROCESS | POSTPROCESS | LABEL | SCHEDULE |
| ... | | | | | | | |

FIG.6 27 BACKUP DATA TABLE

| 271 | 272 | 273 | 274 | 275 | 276 | 277 |
|---|---|---|---|---|---|---|
| HOST COMPUTER NAME | MOUNT POINT | BACKUP CLASSIFICATION | DEVICE ID | MEDIA ID | LABEL | TIME STAMP |
| ... | | | | | | |

FIG.7 37 VOLUME MANAGEMENT TABLE

| 371 | 372 | 373 | 374 | 375 | 376 |
|---|---|---|---|---|---|
| Vol. NUMBER | FC I/F NUMBER | FC Port Addr. | LUN | LIST OF COPY DESTINATION Vol. NUMBER | VOLUME INFORMATION |
| ... | | | | | |

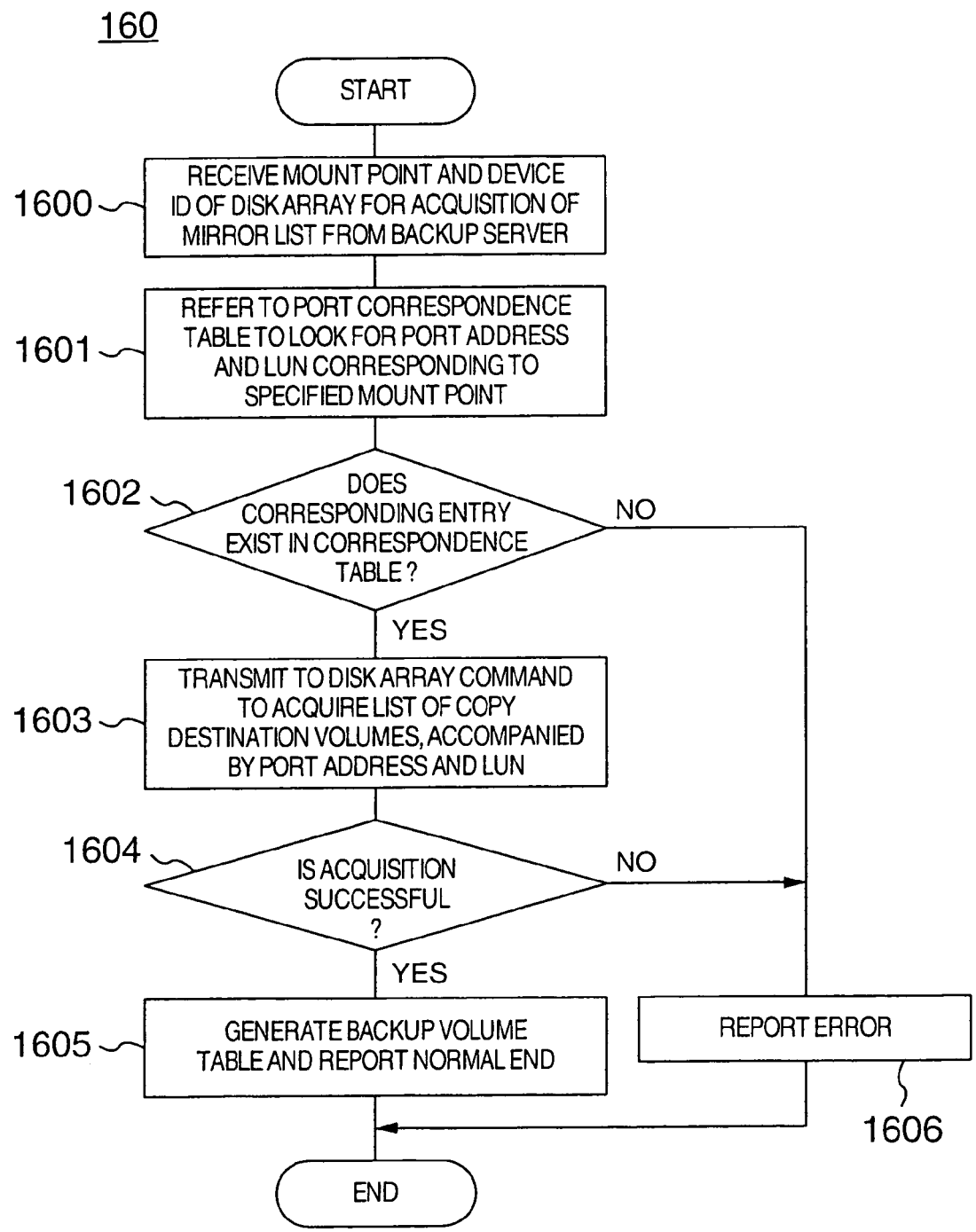

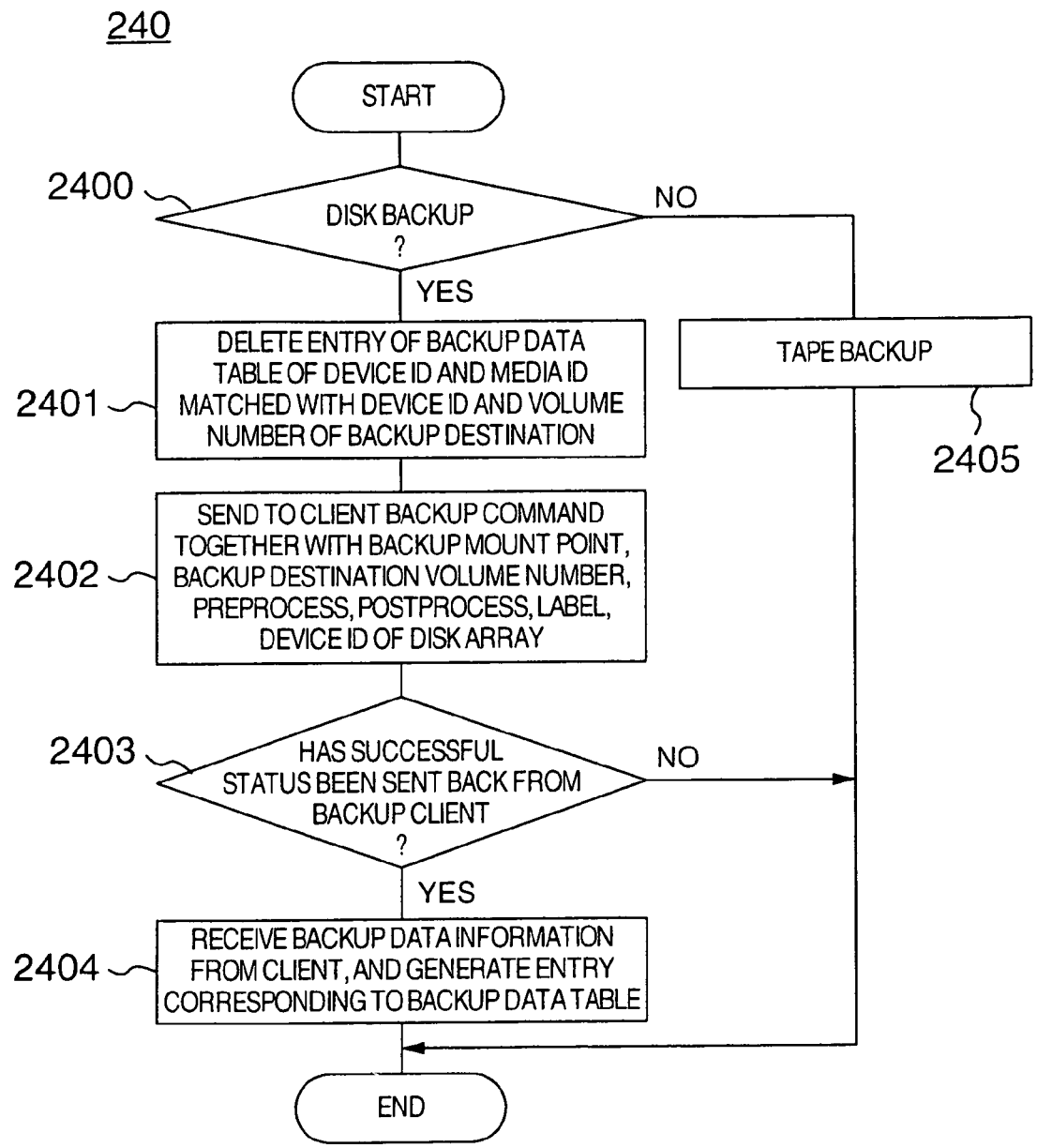

FIG.11

50 VOLUME INFORMATION

| BYTE OFFSET | INFORMATION | |
|---|---|---|
| 0 | FORMAT ID | ~501 |
| 4 | LABEL | ~502 |
| 132 | HOST | ~503 |
| 164 | MOUNT POINT | ~504 |
| 420 | TIME STAMP | ~505 |
| 424 | (reserved) | ~506 |

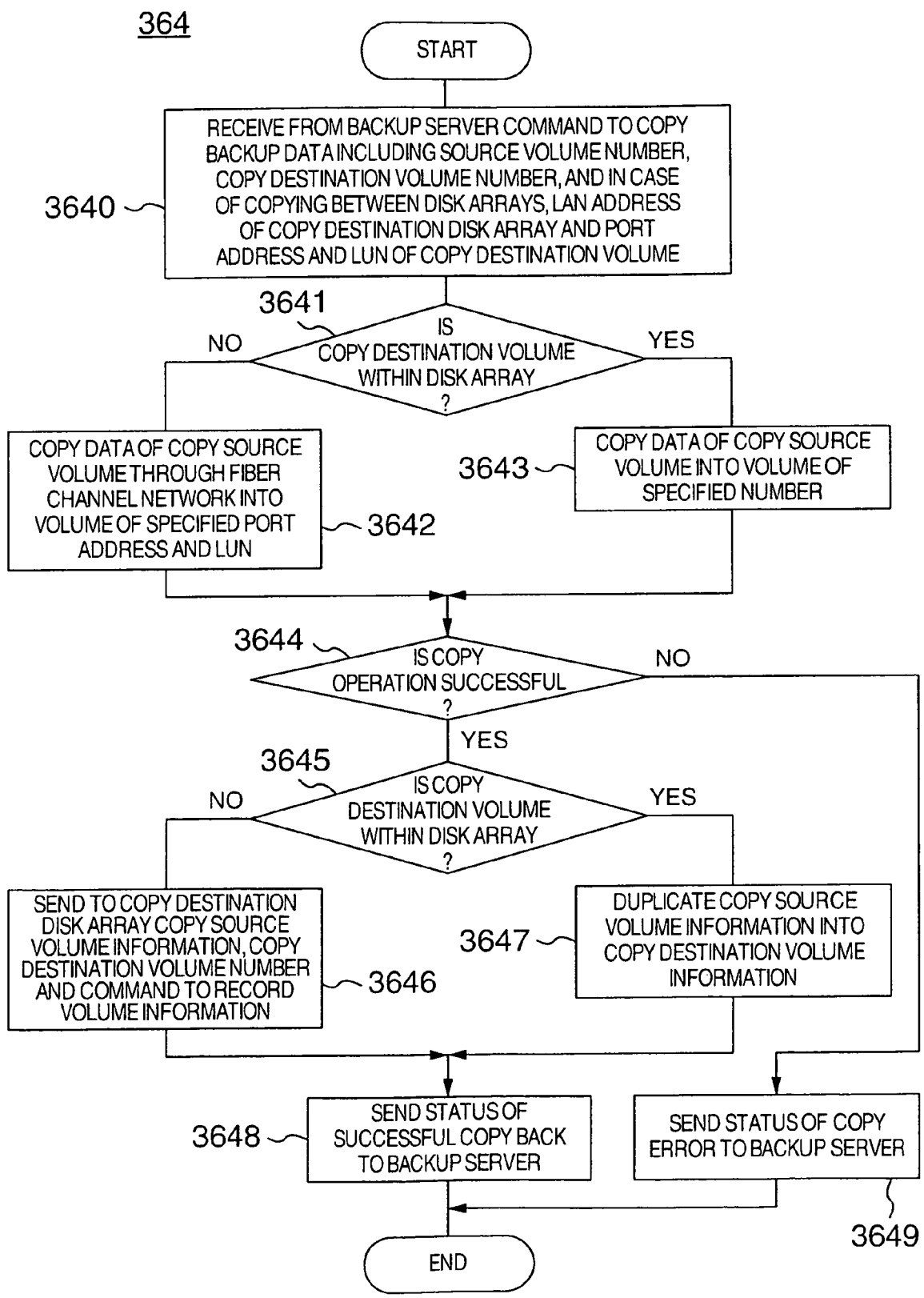

DATA BACKUP METHOD AND SYSTEM

The present application is a continuation of application Ser. No. 10/650,858, filed Aug. 29, 2003, now U.S. Pat. No. 7,013,373 the contents of which are incorporated herein by reference.

BACKGROUND OF THE INVENTION

The present invention generally relates to methods for backup of data stored in a computer system, and particularly to a method for backup of data by using the data copying function of a disk array system and its function to acquire frozen images of data (snapshot function), and to a system using this method.

The computer system is now required to always make stable operation and to avoid the situations in which the computer system halts the service because of accident or maintenance. In addition, even if a trouble occurs on the computer system by any possibility, it is necessary to minimize the loss of data within the computer system, and to restore the system to its former state as soon as possible.

In the prior art, data-updating operation is regularly frozen (freezing), and at this time data is copied (backed up) onto a storage medium such as inexpensive magnetic tape. Thus, if some data is lost by a fault, the data is recovered (restored) from the tape, thus full data being kept safe. On the tape are stored not only the data and control information necessary for the computer system, but also information necessary for the management for the data to be backed up by using part of the storage region of the tape.

This management information includes codes for identifying the data contents and the dates on which the backup data was acquired as, for example, described in "File Structure and Labeling of Magnetic Tapes for Information Exchange", $4^{th}$ Edition, Standard ECMA-13, December, 1985, pp. 7-19. The software (backup software) for controlling the backup and restore processes usually manages the list (catalog) of the produced backup data, and when the externally produced backup data is added and managed, it adds necessary information to the catalog by referring to the management information recorded on the tape.

Recently, use of "on-line backup" has advanced. This on-line backup uses "data mirror function" or "snapshot function" to generate a backup image (snapshot) quickly so that data can be copied onto the tape while a computer system is operating. The data mirror function duplicates data on a plurality of storage regions (disk volumes) and freeze one of the regions as a snapshot of data according to need. The snapshot function saves, at the time of data update, the data to be updated before update and provide a frozen image of the disk volume at a certain time point with both the current disk volume content and the before-update data. These functions are provided in the software on the computers or disk arrays.

The data mirror function is disclosed in, for example, U.S. Pat. No. 5,845,295, and the snapshot function in, for example, U.S. Pat. No. 5,649,152.

SUMMARY OF THE INVENTION

Since the cost of the disk drive has much been reduced in these years, the trend to store backup data on the disk drive has been strengthened as compared with the case when it is stored on the tape. In the former case, the backup data is generated by the data mirror function or snapshot function within the disk array, and used as it is without being copied onto the tape, so that the backup and recovery operations can be speeded up.

However, since the backup data produced by using the data mirror function or the snapshot function is the frozen image of the data to be backed up, it has only the same storage capacity as the data to be backed up, or has no extra storage capacity for recording the backup management information as on the tape media. If the storage capacity is expanded for the management information, the address space of the region in which the backup data is stored and which is recognized by the computer is changed enough to make it difficult to address the data. Therefore, it is difficult to move/copy the backup data that has data and management information combined as backup data or associated with each other.

Since the backup data produced by use of the data mirror function or the snapshot function is supposed to use as it is in order that it is copied onto the tape, but not transferred to other media, there is no need to associate the backup data with the management information on the disk. Thus, the above problem is not caused, and any documents disclosed about this problem are not found.

It is an object of the invention to provide a backup method capable of recording management information such as backup date in association with the backup data stored on the disk volumes, and making the same management as the backup data stored on the tape is managed, and a system using this method.

The above problem can be solved by providing on the disk array the regions in which the management information for the backup is stored for each disk volume and the interface through which the management information of a particular disk volume is read and written from the external computer so that the data stored in the disk volumes can be used as the backup data.

When the data within the disk array are backed up, the backup program on the computer orders the disk array to generate the snapshot of the data-stored disk volumes. The disk array produces the snapshot of the disk volumes by using the data mirror function or the snapshot function. The computer transmits the information about the backup program and such information as backup date and time and content identifiers pertaining to the snapshot to the disk array. The disk array causes these information to be recorded on the storage regions associated with the disk volumes of the snapshot. The backup program also causes these management information to be recorded on the catalog of the backup data, so that the generated snapshot can be added to manage as the backup data.

Thus, the backup data are stored in the storage regions within the disk array, and the management information for the backup data are stored within the disk array in association with the storage regions of the backup data. The management information includes the information about the backed-up data, and the information about the regions in which the backup data have been stored.

If the catalog that the backup program holds is lost, the management information corresponding to the disk volume of the disk array is read out and used to reproduce the catalog. Also, if the disk array has the function to copy the disk volumes, it copies not only the data recorded on the disk volumes but also the management information incidental to the disk volumes. By treating the data of the disk volumes and the accompanying management information in association with each other, it is possible to manage the disk volumes in the same way as the tape is managed on which the data and management information are stored together.

Other objects, features and advantages of the invention will become apparent from the following description of the embodiments of the invention taken in conjunction with the accompanying drawings.

BRIEF DESCRIPTION OF THE DRAWINGS

FIG. 3 shows an example of a port correspondence table.

FIG. 4 shows an example of a backup volume table.

FIG. 5 shows an example of a backup definition table.

FIG. 6 shows an example of a backup data table.

FIG. 7 shows an example of a volume management table.

FIG. 8 is a flowchart showing an example of the procedure for acquiring a copy-to-volume list.

FIG. 9 is a flowchart showing an example of the backup process that the backup server makes.

FIG. 11 shows an example of the structure of volume information.

FIG. 19 is a flowchart showing an example of the inter-volume data copy process that the disk array makes.

DESCRIPTION OF THE EMBODIMENTS

Embodiments of the invention will be described with reference to the accompanying drawings.

According to the first embodiment of the invention, in a computer system including a disk array that has the data mirror function and the function to record the backup information for each volume, and computers connected to the disk array through a fiber channel network, the backup data of a certain volume (hereafter, called primary volume) is stored in a mirror volume (that is the volume for storing the same data as in the primary volume, and hereafter referred to as secondary volume) by the data mirror function and backup information recording function that the disk array has, and the data stored in the secondary volume are managed and copied onto the magnetic tape by a backup server.

(1) Construction of System

Figure 1:
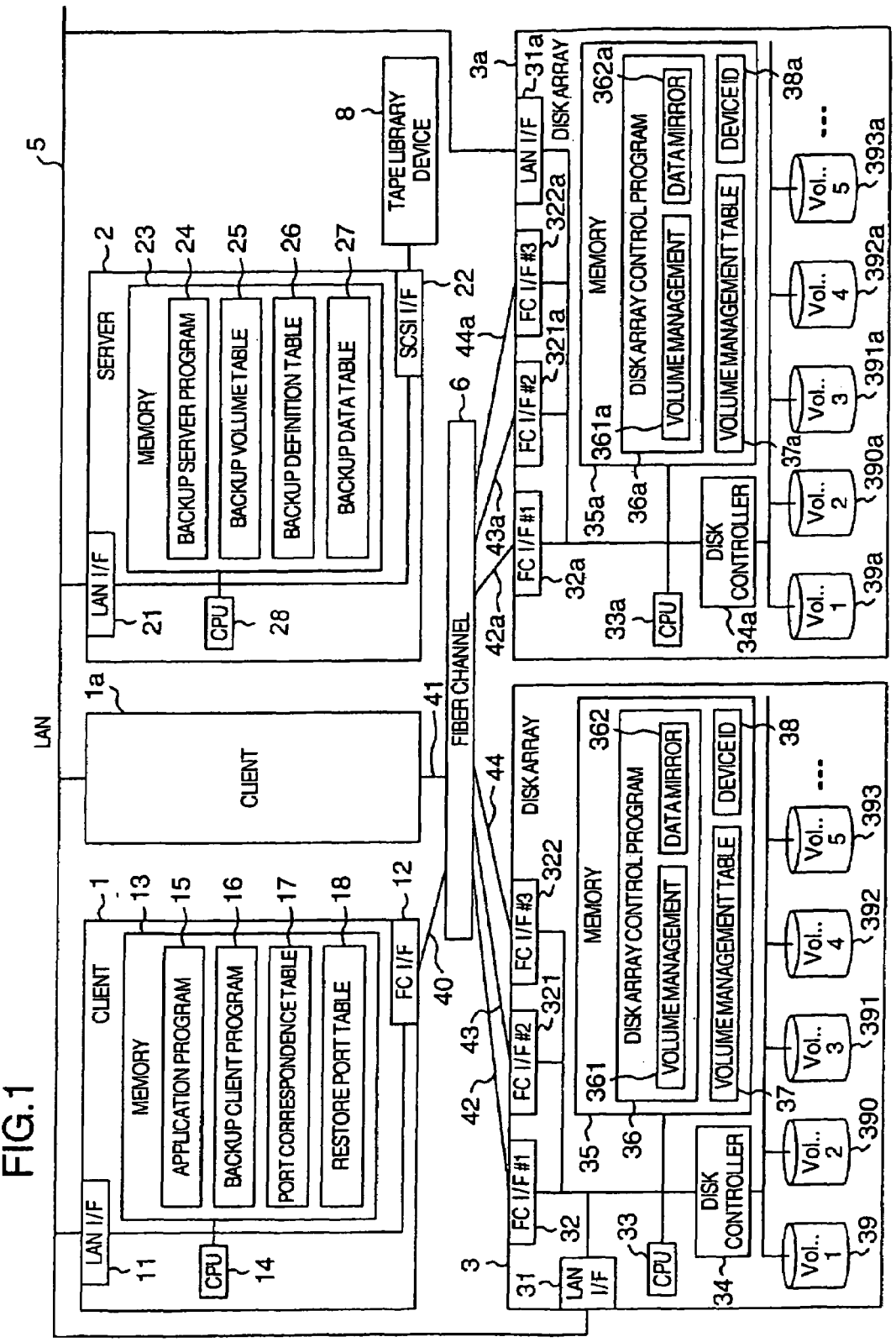
FIG. 1 is a block diagram of an example of the construction of the system to which the invention is applied.

FIG. 1 shows the whole construction of this embodiment. The whole construction of FIG. 1 has client computers 1, 1*a* (hereafter, represented by reference numeral 1), a backup server 2 and disk arrays 3, 3*a* (hereafter, represented by reference numeral 3). The client computer 1 and disk array 3 are connected through fiber channel (FC) cables 40~44 (42*a*~44*a*) to a fiber channel switch 6. The client computer 1 reads/writes data from/in the disk volumes of the disk array 3 through a fiber channel network (hereafter, referred to as fiber channel network (FC network) 6) that is formed of the fiber channel (FC) cables 40~44 and the fiber channel switch 6. The client computer 1, the backup server 2 and the disk array 3 can be communicated with each other through a local area network (LAN) 5. While the computer 1, 1*a* and disk array 3 are connected through the fiber channel network 6 in this embodiment, the present invention does not depend on the communication media and connection mode, but may be applied to a connection mode in which the fiber channel switch 6 is not used, communication media such as SCSI or IP network other than the fiber channel and a structure using protocol. Also, while the client computer 1 is called client by contrast with the backup server, it may be a normal server that makes work-related operations.

The client computer 1 has a LAN interface (LAN I/F) 11 and a fiber channel interface (FC I/F) 12 for the communication through the LAN 5 and FC network 6. It also has a memory 13 for storing program and data, and a CPU 14 for execution of the program. The memory 13 has programs such as an application program 15 and a backup client program 16 previously stored therein. The application program 15 generates and utilizes the data stored within the disk array 3 that are to be backed up, so as to execute work-related processes.

Figure 2A:
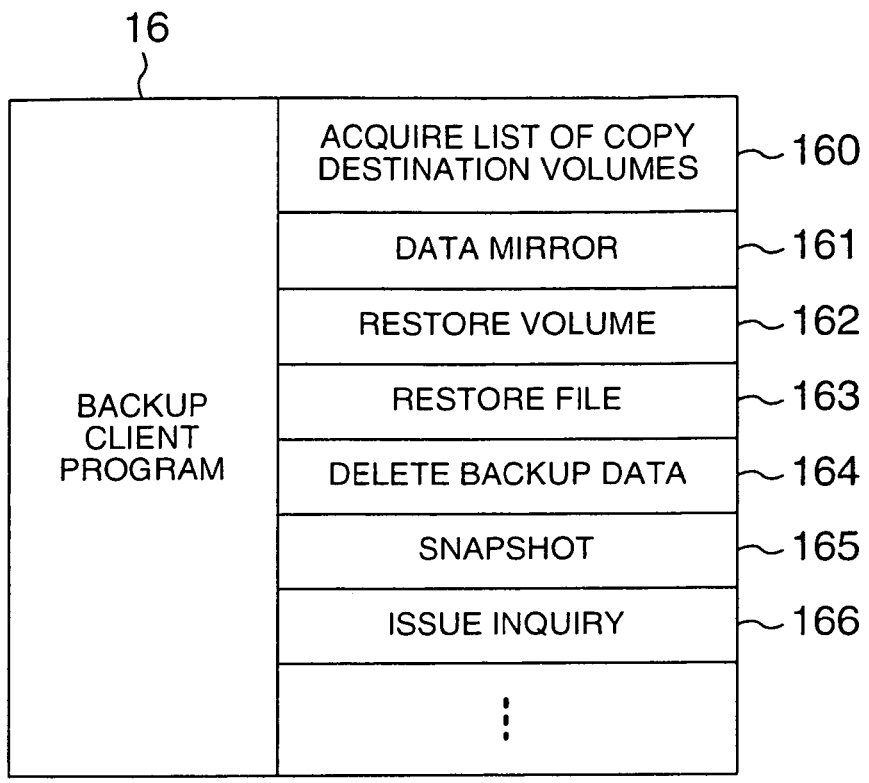
FIGS. 2A and 2B show examples of the function of the backup program.

FIG. 2A shows the functions of the backup client program 16. These functions are a copy-to-volume list acquisition 160, a data mirror 161, a volume/restore 162, a file/restore 163, a backup data deletion 164, a snapshot 165 and an Inquiry issue 166. Most of these functions are achieved in cooperation with a backup server program 24 and a disk array control program 36 which will be described later.

The client computer 1 has, though not shown, a correspondence table that correlatively lists devices ID38, 38*a* of disk array 3, 3*a* and LAN address for the communication with the disk array 3, 3*a*, and thus it can communicate with the disk array 3, 3*a* of desired device ID38, 38*a* through LAN 5.

The client computer 1 also has, as shown, a port correspondence table 17 and a restore port table 18 in which necessary information for backup process and restore process is stored. The port correspondence table 17 has the information shown in FIG. 3 for each disk volume to be backed up. Referring to FIG. 3, the column of a mount point 171 shows the mount points of disk volumes, the column of a device file 172 shows the device files of disk volumes, and the column of an FC address (FC Port Addr.) 173 shows the fiber channel port addresses of a fiber channel interface (FC I/F) 32 of the disk array 3 that are used when a disk volume is accessed to. The column of a LUN 174 shows the Logical Unit Numbers (LUN) given to the disk volumes within the disk array 3. On the restore port table 18 are recorded the FC port addresses and LUN that are previously determined in order that the backup data within the disk array 3 can be accessed to.

The backup server 2 has a LAN interface (LAN I/F) 21, a memory 23 and a CPU 28. The backup server 2 is connected through a SCSI interface (SCSI I/F) 22 to a tape library device 8.

Figure 2B:
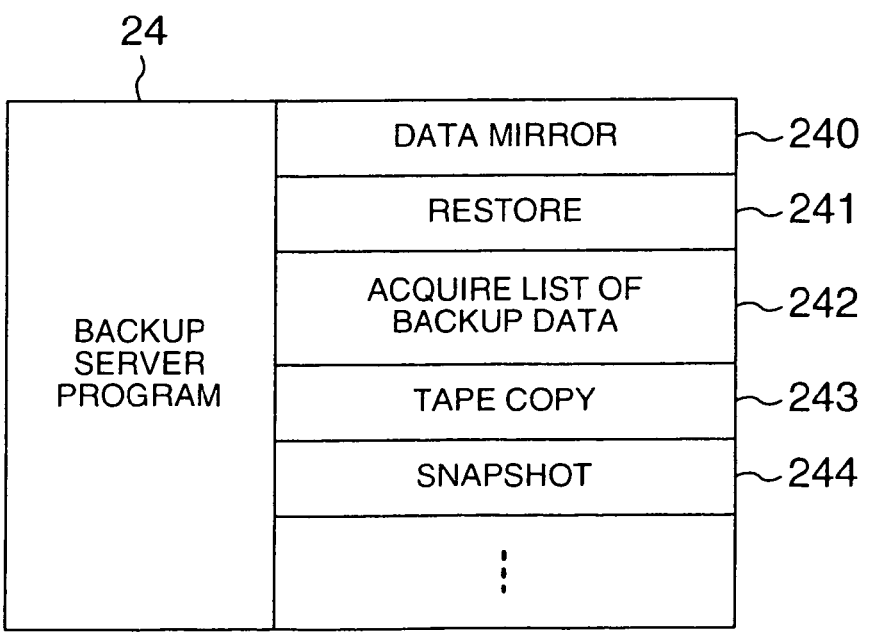

The memory 23 has a backup server program 24 stored therein. FIG. 2B shows the functions of the backup server program 24. These functions include a data mirror 240, a restore 241, a backup data list acquisition 242, a tape copy 243, and a snapshot 244 in addition to general backup functions (for example, file backup function). Most of these functions are achieved in cooperation with the backup client program 16 and the disk array control program 36 which will be described later. It also has a user interface function for the user to be instructed from a backup manager (system manager), though not shown in FIG. 1.

The memory 23 also has a backup volume table 25 that records the list of volumes in which the copy of data can be stored by using the data mirror function of disk array 3, a backup definition table 26 that records the backup sections defined by the user, and a backup data table 27 that manages the acquired backup data.

The backup volume table 25 has the structure shown in FIG. 4, and stores a host computer name 251 as the denomination of the client computer 1 that uses the disk volumes to be backed up, its mount point 252, a device ID253 of the disk array 3 that provides the disk volumes, a volume number list 254 of the disk volumes in which the copy of data is stored by the data mirror function.

The backup definition table 26 has the structure shown in FIG. 5. The column of host computer name 261 and mount point 262 show the names and mount points of the client computer 1 that uses the disk volumes to be backed up. The column of backup classification 263 indicates whether the backup data is stored or not in the secondary volume by using the data mirror function. If "disk backup" is indicated on this column, the backup data is stored in the secondary volume by the data mirror function. If "tape backup" is indicated on this column, backup process is made so that the data is stored on the magnetic tape. The backup to the magnetic tape is performed by the conventional backup process, and thus will not be described. The column of backup destination 264 indicates the device ID38 of the disk array 3 and the volume number of the secondary volume in which the backup data is stored when the backup classification 263 shows the use of the data mirror function. If "tape backup" is indicated on the column, the backup destination 264 shows the identifier of the tape on which the data is stored. The columns of preprocess 265 and postprocess 266 show the processes that are respectively to be executed before and after the backup process. If database is backed up, the preprocess is executed as a program to order the database management program to stop the update of data before the backup, and the postprocess is executed as a program to order the database management program to resume the data update process after the backup. Therefore, since data of the database is not updated during the backup process, the data stored in the primary volume can be assuredly matched with the backup data stored in the secondary volume. The column of label 267 indicates the text for the backup manager to identify the backup data. By storing the text for the content of data and the objective of backup, it is possible to help the manager look for the backup data with ease at the time of restoring. The column of schedule 268 indicates the date and time at which the backup process is executed. If the schedule is set to a particular date and time or every day or every week, the backup process is automatically executed at the predetermined date and time.

The backup data table 27 has the structure shown in FIG. 6. The entries in the table are performed for each backup data. The column of host computer name 271 shows the name of the client computer 1 that uses backup data. The column of mount point 272 indicates its mount point, and that of the backup classification 273 indicates whether the backup data has been stored in the secondary volume by the data mirror function. If the backup classification 273 indicates that the backup data has been stored in the disk volume, the device ID38 of the disk array 3 having that data is indicated by the device ID274, and the volume number by the media ID275. When "tape backup" is specified, the identifier of the magnetic tape drive 6 on which the backup data has been stored, and the identifier of the media are indicated by the device ID274 and media ID275, respectively. The column of label 276 shows the same as the label 267 of the backup definition table 26, and the column of time stamp 277 indicates the date and time at which the backup has been achieved.

The disk array 3 has interfaces LAN I/F31 (31a) and FC I/F32 (321, 322, and 32a, 321a, 322a) for the communication through LAN 5 and FC network 6. Each interface has its own number within the disk array in order to identify each of a plurality of FC interfaces (FC I/F). The disk array 3 also has disk volumes 39, 390~393 (that include 39a, 390a~393a, and are represented by reference numeral 39) and a disk controller 34 for controlling data to be transferred to the disk volume 39. The disk volume 39 is the storage region from/in which data is read/written through the FC network 6 according to the application program 15 of the client computer 1. These disk volumes are constructed within one or more disk drives. Each disk volume 39 has its own number within the disk array, and is identified by its number.

The memory 35 has a disk array control program 36 for controlling the operation of the disk array 3, a volume management table 37 for managing the disk volumes 39 within the disk array 3, and device ID38. The disk array control program 36 has the basic functions of disk array 3 such as the assignment of ports and LAN to the disk volumes 39 and the data input/output, and other functions such as volume management function 361 for the reference/recording of management information of the numbers of disk volumes 39 and backup date and time, and a data mirror function 362 for the data recorded in a particular volume to be copied into another volume. The disk control program 36 also has a function to return an answer including the device ID38 in response to the Inquiry command sent from the computer through the FC network. These processes are executed by a CPU 33.

The data mirror function 362 is to copy the data of the copy source volume (primary volume) into one or more copy destination volumes (secondary volumes) that have the same storage capacity as the primary volume. The access to the primary volume from the computer is accepted even during the copying operation, but when the data of the primary volume is updated, the data of the region to be updated is copied into the second volume before the update operation. Thus, the content of the secondary volume at the time of the completion of the copying operation is the same as that of the primary volume at the time of the start of the copying operation. The data mirror function 362 includes a function to restore (recover) the content copied into the secondary volume so that it can be stored back in the primary volume. The method of achieving the data mirror function is described in, for example, U.S. Pat. No. 5,845,295 (pages 6 through 8, FIG. 3), and will not be described in detail because it is different from the main subject of this invention.

The volume management table 37 has the structure shown in FIG. 7, and the entry in this table is performed for each disk volume. The structure of the volume management table 37 has columns of a volume number 371, an FC interface number 372 assigned to the access to the disk volume, an FC port address 373, a LUN 374 assigned to the disk volume, a disk volume number 375 assigned to the mirror destination (copy destination) of that volume, and volume information 376 of backup information. The column of mirror destination volume number 375 records the numbers of one and more volumes to which data is copied, but no data when the data mirror function is not used.

The device ID38 within the disk array 3 has its own identifier for each disk array device. When a plurality of disk arrays 3, 3a are connected to the FC network 6, those arrays are identified by devices ID38, 38a.

(2) Definition of Backup Session

A description will be made of how to define the backup session for storing the backup data in the secondary volume by use of the data mirror function in this embodiment.

In order to define the backup session of the disk volumes used by the client computer 1, entries for backup definition are made in the backup definition table 26 of the backup server 2. The backup manager specifies the entries in the columns of host computer name 261, mount point 262, preprocess 265, postprocess 266, label 267 and schedule 268 of the backup definition table shown in FIG. 5 through the user interface (though not shown, the terminal connected to the backup server 2). The manager also specifies "disk backup" that indicates the backup using the data mirror function on the column of backup classification 263 through the user interface, and specifies the volume number of the secondary volume in which the backup data is stored by use of the data mirror function on the column of backup destination 264. The disk volume number that can be used as the destination to which the disk volume specified by the host computer name 261 and mount point 262 is copied by the data mirror function is selected from the volume number list 254 of which the numbers are specified by the corresponding host computer name 251 and mount point 252 in the backup volume table 25 shown in FIG. 4. The selection of volume number from the volume number list 254 of the backup volume table 25 is made by supplying the content of the backup volume table 25 to the terminal connected to the server 2 in response to the order from the manager through the user interface.

When the backup volume table 25 has no corresponding entries in the columns of host computer name 251 and mount point 252, the backup server program 24 orders the backup client program 16 of client computer 1 specified by the host computer name through LAN 5 to acquire the copy-to-volume list for the disk volume corresponding to the specified mount point. The operation of the backup client program 16 ordered to acquire will be described with reference to the flowchart of FIG. 8.

When the order to acquire the copy-to-volume list with the mount point attached is received from the backup server 2 (step 1600), the program refers to the port correspondence table 17, looking for the FC port address 173 and LUN174 of the disk volume corresponding to the specified mount point 171 (step 1601). If there is no corresponding mount point on the port correspondence table 17 (step 1602), the program reports error to the backup server 2 (step 1606). If there is the corresponding mount point on the port correspondence table 17, the program sends the Inquiry command to the FC port address 173 and LUN174, thus acquiring the device ID included in the response to the Inquiry. If the operating system of the client computer 1 supports the function to send the Inquiry command by use of the device file, the Inquiry command can be transmitted by use of the device file 172. Since the client computer 1 has the correspondence table of the device ID and IP address of the disk array as described above, the IP address of disk array 3 can be obtained by referring to the table at the device ID. The order to acquire the copy-to-volume list with FC port address 173 and LUN174 attached is transmitted through LAN5 to the disk array 3 of the IP address (step 1603).

The disk array control program 36 of disk array 3 ordered to acquire refers to the volume management table 37, and sends to the client computer 1 the copy destination volume number list 375 and device ID38 of the disk volume of the FC port address 373 and LUN374 corresponding to the specified FC port address 173 and LUN174. If there is no specified FC port address 173 and LUN174 on the volume management table 37, the program reports error to the client computer 1.

When the backup client program 16 of the client computer 1 receives the report of error (step 1604), it reports error to the backup server 2 (step 1606). If the backup client program 16 receives the list of copy destination volume numbers, it sends the host computer name of client computer 1 and the mount point and device ID sent from the backup server 2 and the list of copy destination volume numbers to the backup server 2 so that the backup server 2 can cause them to be stored as the new entries in the backup volume table 37 (step 1605). The backup server program 24 records the received information on the backup volume table 25.

(3) Acquisition of Backup Data Using Data Mirror Function

Figure 10:
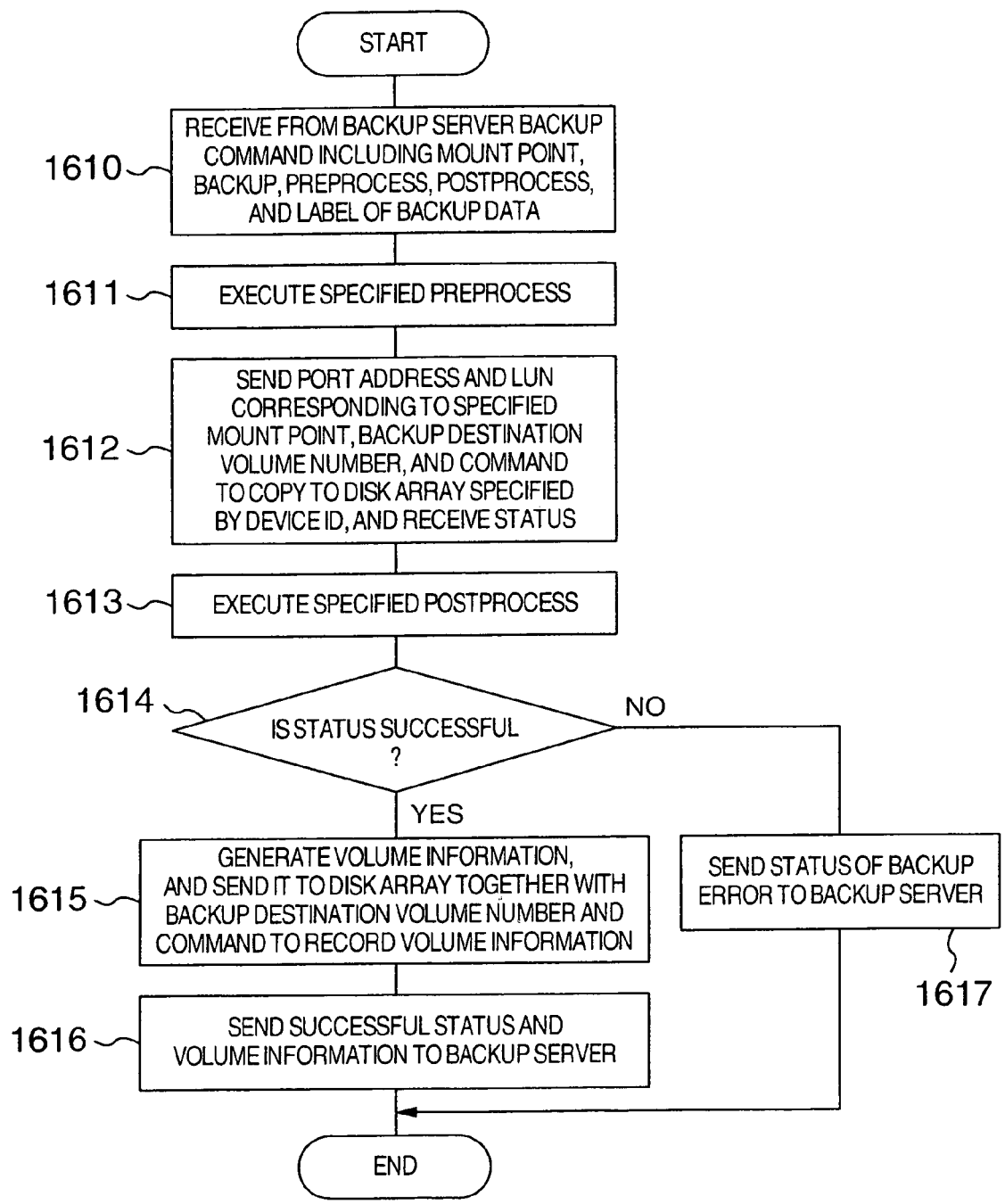
FIG. 10 is a flowchart showing an example of the backup process that the backup client makes.

The process for acquiring the backup data by use of the data mirror function 362 will be described with reference to the flowcharts of FIGS. 9 and 10.

The backup server program 35 associated with the data mirror function 240 shown in FIG. 9 is started to execute according to the schedule 268 of the backup definition table 26 or to the instruction through the user interface from the manager of backup. The program refers to the backup classification 263 of the backup definition table 26 (step 2400). If the classification is "disk backup", the program makes backup process using the data mirror function 362. If not so, it makes backup process using the normal magnetic tape (step 2405). When the backup process is executed by use of the data mirror function 362, the program deletes the entries in the backup data table 27 having the device ID274 and media ID275 (when the disk volume is used for storing the backup data, the volume number is stored in the media ID275) that match the device ID and volume number of the backup destination indicated by the backup destination 264 of the backup definition table 26 (step 2401). Then, the program sends, together with the backup order, the mount point 262, backup destination 264, the contents of preprocess 265 and postprocess 266, and the label 267 of backup data to the client computer 1 of computer name 261 stored in the backup definition table 26 (step 2402). If the status sent back from the client computer 1 is successful (step 2403), the program receives the volume information of backup data from the client computer 1, and records it on each item of the backup data table 27 (step 2404).

The operation of the backup client program 16 will be described with reference to the flowchart of FIG. 10. When the program receives from the backup server program 24 the mount point 262 to be backed up, backup destination 264, the contents of preprocess 265 and postprocess 266, the label 267 of backup data and the order to backup (step 1610), it performs the specified preprocess 265 (step 1611). The program obtains the FC port address 173 and LUN174 of the mount point 171 corresponding to the mount point 262 specified by referring to the port correspondence table 17, and sends the FC port address 173 and LUN174, the volume number of backup destination 264, and the order to copy by use of the data mirror function 362 to the disk array 3 indicated by the device ID of the backup destination 264. The program waits for the report of status from the disk array 3 (step 1612).

The disk array control program 36 of the disk array 3 that received the order to copy by the data mirror function 362 refers to the volume management table 37 so as to check if the volume number specified as the backup destination is recorded or not in the copy destination volume number list of the FC port address 373 and LUN374 disk volume corresponding to the FC port address 173 and LUN174 specified to be backed up. If it is recorded, the content of the disk volume is copied into the disk volume of the specified number by the data mirror function 362, and the successful status is sent back to the client computer 1. If it is not recorded, the failure status is sent back to the client computer 1.

The backup client program 16, when the client computer 1 has received that status, executes the specified postprocess 266 (step 1613). If the failure status is sent back from the disk array 3 (step 1614), a status of backup error is transmitted back to the backup server 2 (step 1617). If the successful status is sent back, the backup client program generates volume information 50 of the backup destination volume, and sends it together with the number of the backup destination volume and the volume information record instruction to the disk array 3 (step 1615).

The volume information is an arbitrary byte train, but in this embodiment it takes a structure of 512 bytes shown in FIG. 11. The format ID501 is an identifier for identifying the format of the volume information. The label 502 is the text sent as label 267 from the backup server program 24.

The host 503 is the host name of the client computer 1. The mount point 504 is the mount point of the backup source volume (primary volume) in which the backup source data is stored. The time stamp 505 is the time at which the disk array 3 is instructed to make the backup by the data mirror function. The remaining blank region 506 is the reserved region for future expansion of the format.

The disk array control program 36 that has received the volume information 50 records the volume information 50 in the entry of the specified-number volume on the volume management table 37, and sends back the recording-successful status.

The backup client program 16 transmits the backup-successful status and the volume information 50 to the backup server (step 1616).

(4) Restore of Backup Data stored in Disk Volume

A description will be made of the process for restoring the backup data stored in the disk volume. The restore process is started when the backup manager selects the restored backup data from the backup data table 27 through the user interface of the backup server 2, and sends a restore command together with the preprocess and postprocess commands. If the backup classification 273 recorded in the backup data table 27 is "tape backup", the process of restoring from the magnetic tape is executed. If it is "disk backup", the restore process is carried out by using the backup data within the disk volume.

The backup server program 24 sends a restore command including instructions of preprocess and postprocess that are accompanied by the volume number stored as the mount point 272, device ID274 and media ID275 to the client computer 1 of host computer name 271 recorded on the backup data table 27.

Figure 12:
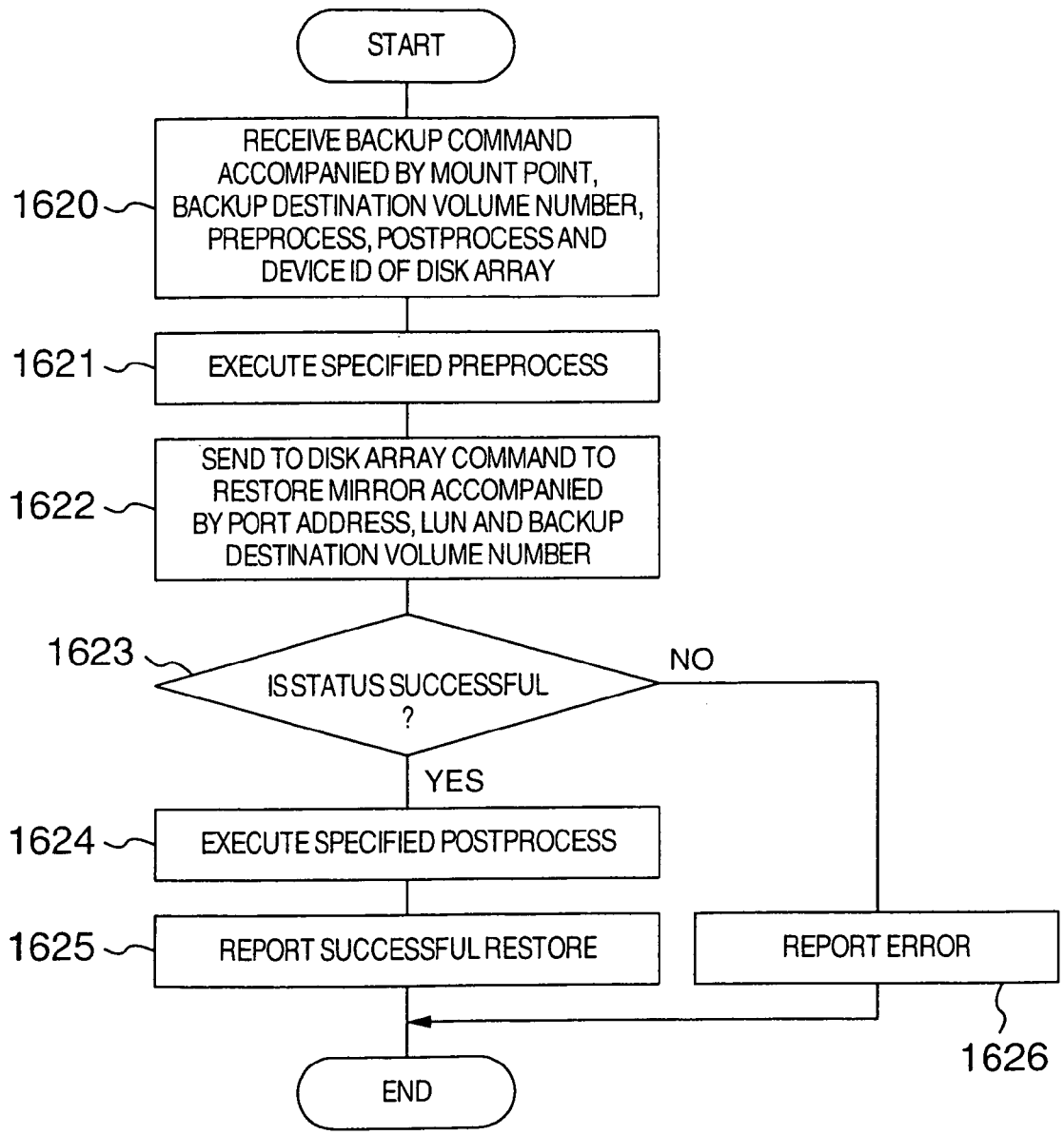
FIG. 12 is a flowchart showing an example of the volume restore process that the backup client makes.

The operation of the backup client program 16 will be described with reference to the flowchart of FIG. 12. When the program receives the command (step 1620), it executes the specified preprocess (step 1621). The preprocess is, for example, the process for unmounting the file system of the restore destination volume. Then, it refers to the port correspondence table 17, and sends to the disk array 3 the volume restore command involving the FC port address 173, LUN174 of the disk volume of the mount point 171 corresponding to the specified mount point 272 and the number of the restore source volume (backup volume)(step 1622).

The disk array control program 36 that received the command refers to the volume management table 37, looking for the copy source volume (primary volume) corresponding to the disk volume of the specified volume number. It copies data from the specified backup volume to the primary volume, and sends back the successful status. If it fails for some reason, it sends back the failure status.

If the program receives the failure status (step 1623), it sends a report of restore error to the backup server 2 (step 1626). If it receives the successful status, it carries out the specified postprocess (step 1624), and sends a report of restore achievement to the backup server 2 (step 1625). The postprocess is, for example, the check process or mount process for the file system of the restore destination volume.

Figure 13:
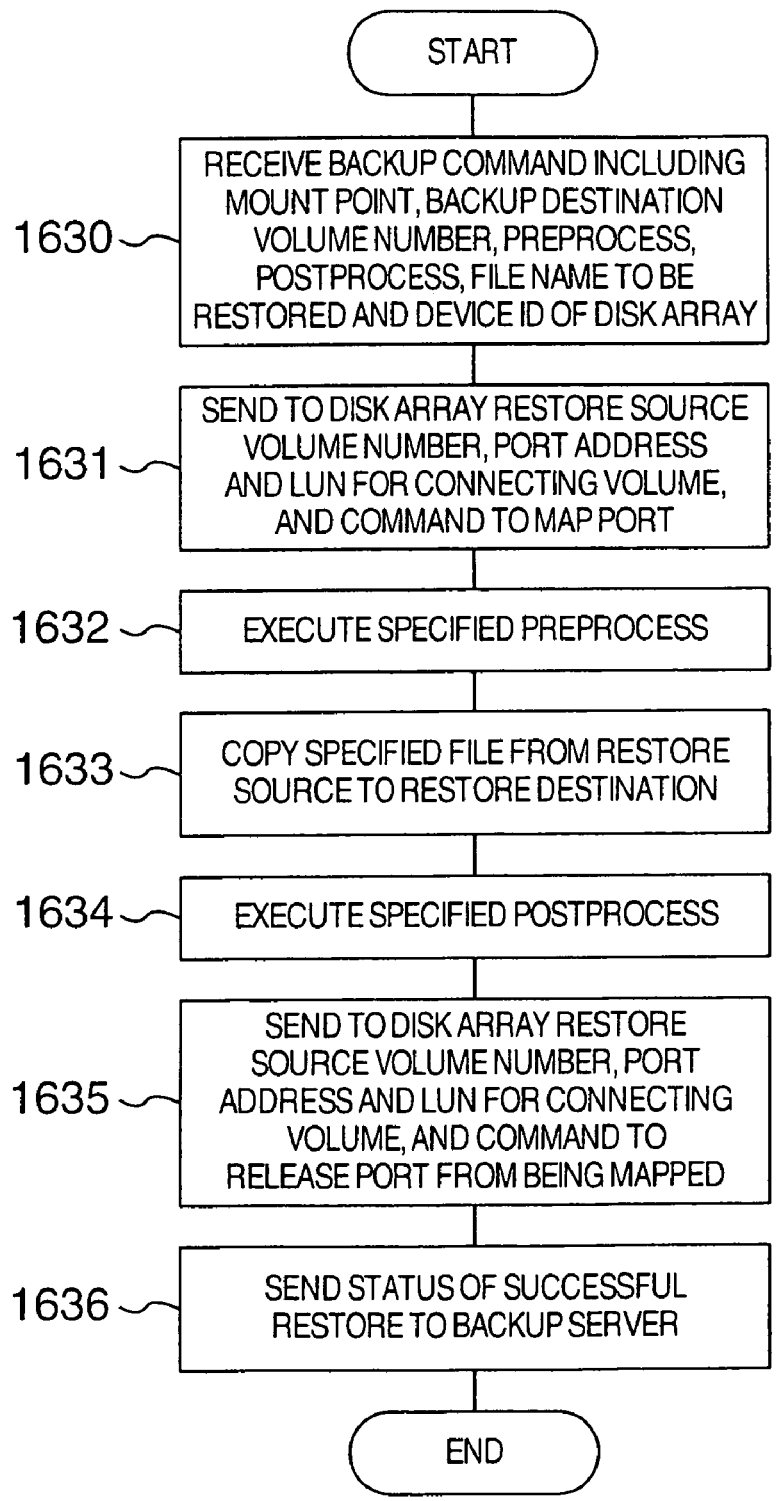
FIG. 13 is a flowchart showing an example of the file restore process that the backup client makes.

The above operations show the flow of operations for restoring the disk volume using the data mirror function 362 of the disk array 3. Some files of the volume contents are restored when the backup client program 16 copies the files. In this case, the command to the backup client program 16 involves the names of files that the manager has specified to restore. The flow of the processes of the backup client program will be described with reference to the flowchart of FIG. 13.

When it receives a command from the backup server 2 (step 1630), it sends to the disk array the specified restore source volume (backup volume) number, and the FC port address and LUN recorded on the restore port table, thereby ordering the disk array to connect the restore source volume to the specified port (step 1631).

The disk array control program 36 assigns the FC interface so that the restore source volume can be accessed to by use of the specified FC port address and LUN.

The backup client program 16 carries out the specified preprocess (step 1632). In this preprocess, it makes inspection/repair (checking) of the file system of the restore source volume (backup volume) if necessary, and mounts at the mount point specified in the content of the preprocess. The backup client program 16 copies the specified file from the restore source to the mount point of the restore destination (step 1633), and after the end of the copy, it executes the postprocess such as unmounting of the restore source volume (step 1634). Also, it orders the disk array 3 to release the port from being assigned to the restore source volume (step 1635), and sends a report of restore achievement to the backup server 2 (step 1636).

(5) Delete of Backup Data

The delete of the backup data recorded in the disk volume is started when the backup manager selects the desired backup data from the backup data table 27 by using the user interface of the backup server 2, and orders to delete. The backup server program 24 sends to the client computer 1 the delete command accompanied by the device ID274 and volume number (the volume number indicated by the media ID275 of backup data table 27) of the disk array 3 in which the selected backup data is stored.

Figure 14:
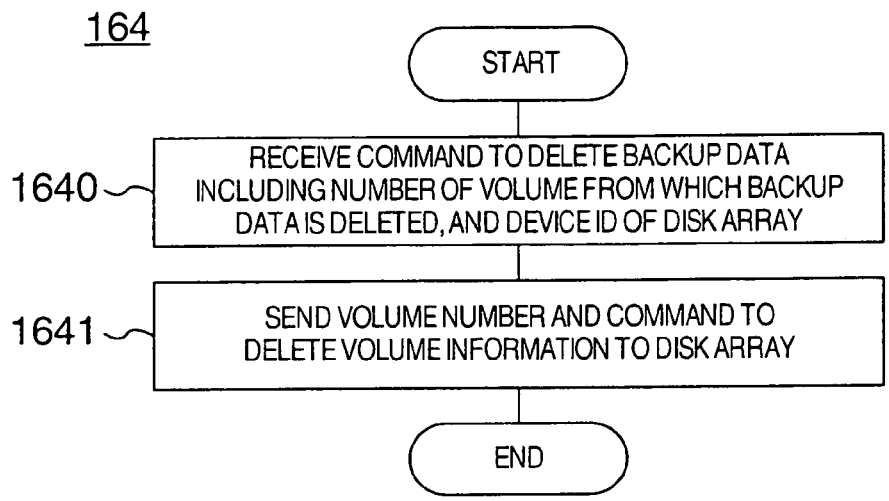
FIG. 14 is a flowchart showing an example of the backup data delete process that the backup client makes.

The operation of the backup client program 16 will be described with reference to the flowchart of FIG. 14. When receiving the command from the backup server 2 (step 1640), the backup client program 16 sends the volume number and the delete command to the disk array 3 (step 1641). The disk array control program 36 refers to the volume management table 37, and deletes the volume information of the specified volume number. Then, the backup server program 24 deletes the corresponding entries of the backup data table 27.

(6) Acquisition of List of Backup Data

Figure 15:
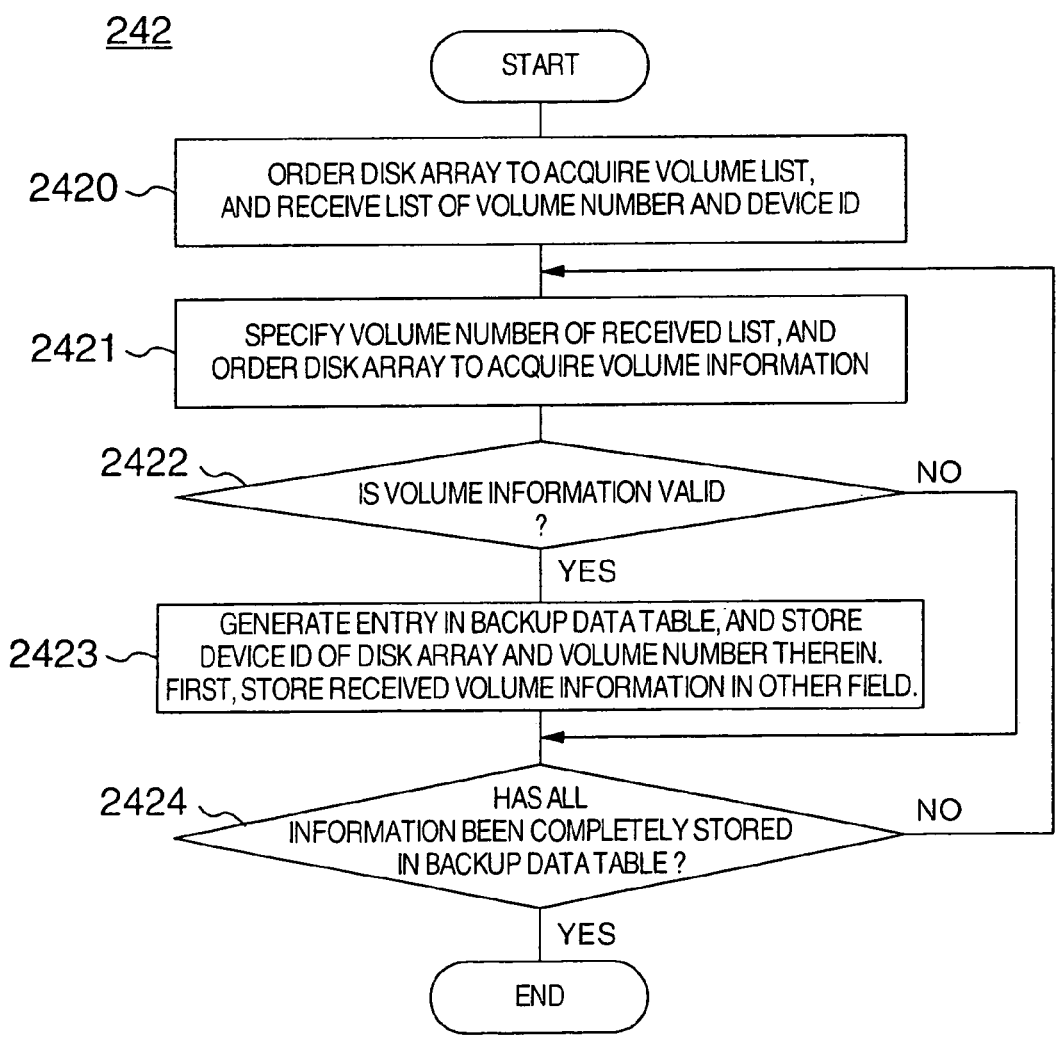
FIG. 15 is a flowchart showing an example of the procedure for acquiring the backup volume list.

When the disk array 3 having the backup data is newly added onto the control of the backup server 2, it is necessary that the existing backup data be added to the backup data table by referring to the volume information of the volumes within the disk array 3 in which the backup data are stored. The operation of the backup server program in that case will be described with reference to the flowchart of FIG. 15.

The backup server program 24 within the backup server 2 orders the disk array to acquire the list of volumes in order for the backup data to be added to the backup data table 27 (step 2420). The disk array control program 36 that has received the command sends the volume number list and device ID stored in the volume management table 37 back to the backup server 2.

The backup server program 24 specifies the volume number of the returned list and orders the disk array 3 to acquire the volume information (step 2421). The ordered disk array control program 36 refers to the volume management table 37 and sends back the specified volume information. The backup server program 24 checks for the validity of the sent-back volume information (step 2422). The validity is decided positive if the format of the returned volume information coincides with the format shown in FIG. 11. The entries are created in the backup data table 27, and the respective items of the volume information are stored in those columns (step 2433). The processes beginning from the step 2421 are repeated for the volumes in which the backup data are stored (step 2424).

(7) Copy of Backup Data to Tape

Figure 16:
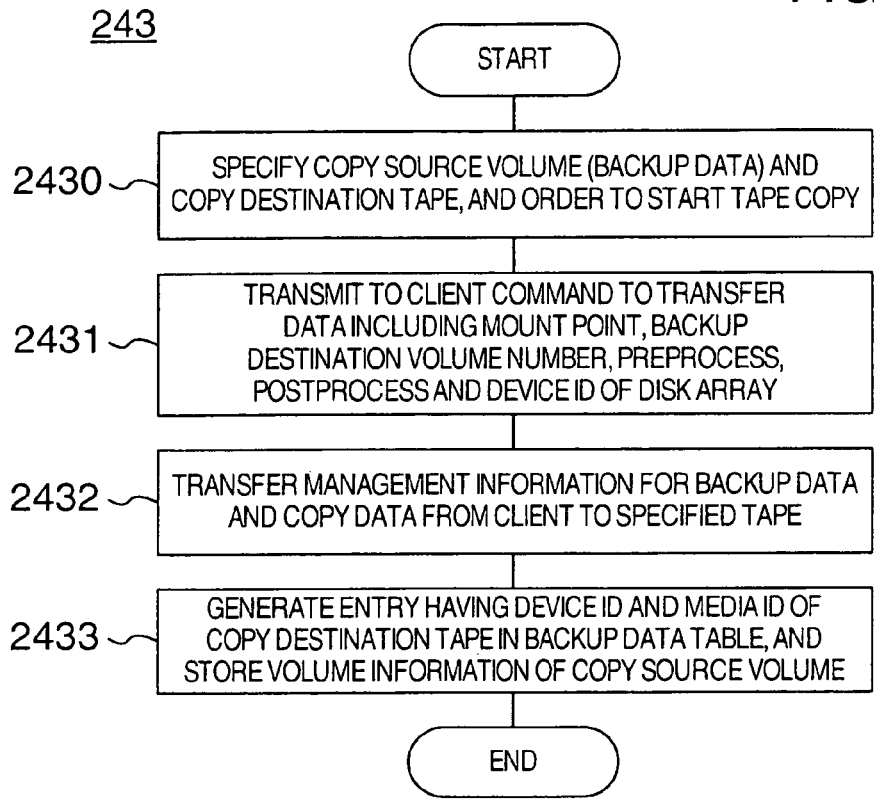
FIG. 16 is a flowchart showing an example of the tape copy process that the backup server makes.

The backup server program 24 within the backup server 2 makes the process for the backup data stored in the disk volume within the disk array 3 to be copied into the tape media of the tape library unit 8. This operation will be described with reference to the flowchart of FIG. 16.

The backup server program 24 within the backup server 2 responds to the input operation by the backup manager to specify the copy source volume in which the backup data is stored, and the copy destination tape (step 2430). The backup server program 24 transmits a command to the client computer 1 of the computer name 271 of the backup data table 27 (step 2431). This command includes the instructions to specify the mount point 272 of the primary volume of the specified backup data, the number of the volume to which the backup is made, and the mount point of the backup volume, preprocess and post process including the mount process, and to perform data transfer. The backup client program 15, when receiving the command, reads data from the volume to which the backup is made (copy source volume) and transfers the data to the backup server through LAN according to the same procedure as in the restore process shown in FIG. 12. The backup server program 24 that has received the data writes the data in the specified tape to which the data is backed up (step 2432). In this case, the program writes data in the tape to which data is backed up after it has stored in the tape the management information including the information stored in the backup data table 27. Finally, it generates new entries in the backup data table 27, and records therein the device ID and media ID of the tape to which data is copied. The other items are copied from the entries of the copy source volume.

In addition to the above copy process, the backup data can be moved from the disk volume to the tape by deleting the above-mentioned backup data within the disk volume.

(8) Effect

According to this embodiment, the data of the disk volume can be backed up by use of the data mirror function of the disk array. In this case, the management information of the backup data can also be stored as the information incidental on the disk volume without altering the address space of the disk volume as seen from the backup client. In addition, the backup data within the volume and the management information can be treated in association with each other when the volume units or file units of the backup data recorded in the disk volume are restored, deleted or copied to the external media such as the magnetic tape. Moreover, the catalog of the backup data can be produced by using the volume management information incidentally recorded in the disk volume.

While this embodiment uses the volume number assigned within the disk array in order to identify the volume to which data is backed up, it may use other information than the volume number if the volume can be uniquely specified. Also, while the backup client program in this embodiment separately transmits a command to copy the disk volume and a command to store volume information to the disk array, it can transmit both commands in a mass, and the disk array control program can decide if data is successfully copied, in which case the volume information can be stored if it is successfully copied. In addition, while the volume management table is recorded in the memory of the disk array in this embodiment, it can be recorded in a storage region on the disk.

In the second embodiment, the disk array has a snapshot function provided in place of the data mirror function 362 used in the first embodiment. The information about snapshot function is disclosed in, for example, U.S. Pat. No. 5,649,152 (pages 6 through 7, in FIG. 2). The whole construction of this embodiment is the case in which the disk array control program 36 in FIG. 1 has the snapshot function in parallel with the data mirror function (the snapshot function is not shown because it would make the diagram complicated). Unlike the data mirror function in which the identifier (volume number) of the volume to which data is copied (secondary volume) is previously selected, the snapshot function automatically assigns a volume number to a generated snapshot. The list of snapshot volume numbers is recorded in the volume management table 37 in place of the copy destination volume number list 375. When a snapshot volume is newly produced, an entry having an unused volume number is added to the volume management table 37, and the newly added volume number is recorded in the snapshot volume number list of the snapshot source volume. The points different from the first embodiment will be given below.

(1) Definition of Backup Session

This embodiment, since the backup source and the corresponding snapshot volume are not previously determined, cannot produce the volume number list 254 of the backup volume table 25. When the backup classification 263 of the backup definition table 26 is "disk backup", the device ID 38 of the disk array 3 is stored in the backup destination 264, but the volume number is not stored.

(2) Acquisition of Backup using Snapshot Function

The flow of backup process using the snapshot function will be described with reference to the flowcharts of FIGS. 17 and 18.

Figure 17:
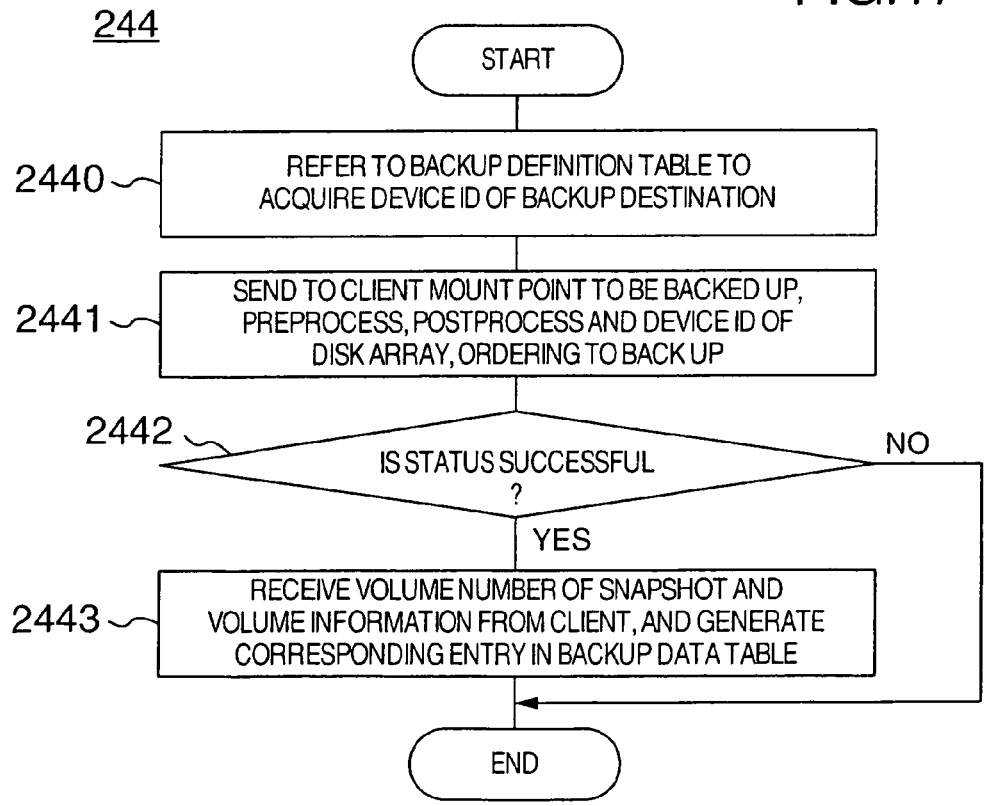
FIG. 17 is a flowchart showing an example of the backup process that the backup server makes.
Figure 18:
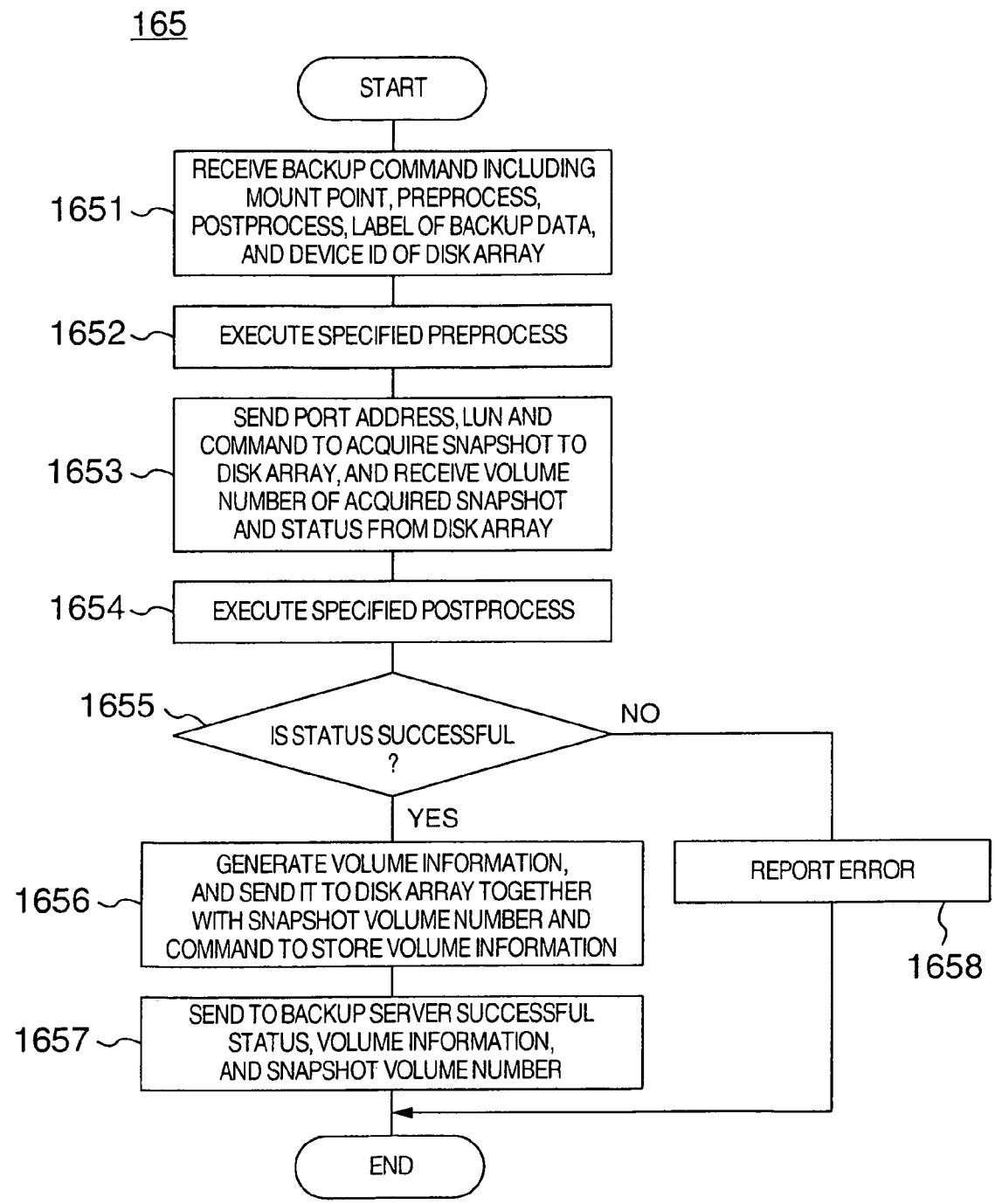
FIG. 18 is a flowchart showing an example of the backup process that the backup client makes.

The processes of the backup server program 24 will be mentioned first with reference to FIG. 17. Since the snapshot is not overwritten on the existing volume, the entry is not deleted (corresponding to the step 2401 in FIG. 9) from the backup data table 27. The program refers to the backup definition table 26 to acquire the device ID (included in the backup destination 264) of the disk array 3 that generates the snapshot (step 2440). This ID is recorded in the backup data table 27 in step 2443. The program orders the client 1 to backup by use of the snapshot accompanied by the mount point 262 to be backed up, preprocess 265, postprocess 266 and the device ID included in the backup destination 264 (step 2441). When the program orders to backup, it does not specify the backup destination volume. If a successful status is sent back (step 2442), the program receives the volume information and the volume number of snapshot from the client 1, and records them in the backup data table 27 (step 2443).

The operation of the backup client program 16 will be described with reference to the flowchart of FIG. 18. The operation of the program is substantially the same as in FIG. 12. In step 1651, the program does not specify the number of the backup destination volume, and in step 1653, it receives the volume number of the snapshot from the disk array. In step 1657, the received volume number is sent to the backup server 2.

(3) Effect

This embodiment can achieve the same backup function as in the first embodiment by use of the snapshot function of the disk array. In general, the snapshot function can hold a large number of snapshots with a smaller capacity required as compared with the data mirror function that copies volumes because only the difference information of each snapshot to the source data is recorded. Therefore, even when multigenerational backup data are acquired, there is no need to move the backup data to the tape, and much backup data can be acquired at short intervals.

The third embodiment has a function added to the first embodiment. This function is to copy the backup data stored in the disk volume to other volumes within the same disk array or in volumes within a different disk array.

(1) Structure of System

The whole structure of this embodiment is the case in which the disk array control program 36 in FIG. 1 has a volume copy function in parallel with the data mirror function (the volume copy function is not shown because it would make the diagram complicated). The points different from the first embodiment will be given below.

The volume copy function is to copy the content of a certain disk volume into another disk volume of the same disk array or a different disk array, and to copy the volume information of the copy source into the volume information of the copy destination volume. The different disk array means that there is the disk array 3a other than the disk array 3.

In addition, the backup server program 24 has a function to order the disk array to copy volumes through LAN.

(2) Copy of Backup Data between Disk Volumes

The flow of processes for copying backup data between disk volumes will be described. The manager selects the copy source backup data from the backup data table 27, and specifies the copy destination volume. The copy destination volume is specified by the volume number. When the disk array of the copy destination is different from that of the copy source, the manager specifies the LAN address of the disk array that has the copy destination volume, and the assigned port address of the FC interface and LUN of the disk volume. These information specified by the manager are transmitted together with the volume copy command to the disk array 3 that has the copy source volume by the volume copy instruction function of the backup server program 24.

The operation of the disk array control program 36 that has received the command will be described with reference to the flowchart of FIG. 19. When receiving the command (step 3640), the program checks to see if the command contains the port address and LUN, and if the copy destination volume exists within the same disk array (step 3641).

When data is copied to a different disk array, the program writes the content of the copy source volume in the volume of the specified port address and LUN through the fiber channel network (step 3642). This process is carried out by, for example, issuing a WRITE command of SCSI from any FC interface. Then, the program goes to step 3644.

When data is copied within the same disk array, data is copied between the specified disk volumes (step 3643).

If data is failed to copy for some reason (step 3644), a copy-error status is sent back to the backup server (step 3649). If data is successfully copied, and if data is copied to a different disk array (step 3645), the program refers to the volume management table 37 to acquire the volume information of the copy source volume, specifies the copy destination volume number, sends it to the copy destination disk array, orders to record the volume information (step 3646), and goes to step 3648, When data is copied within the same disk array, the volume information of the copy source volume is copied into the volume information of the copy destination volume in the volume management table 37 (step 3647).

Finally, the successful status is sent back to the backup server (step 3648). The backup server program 24, when receiving the successful status from the disk array 3, adds the entry of copy destination volume to the backup data table.

(3) Effect

According to this embodiment, the backup data stored in the disk volume can be copied into another volume of the same disk array or different disk array. Thus, the portability of backup data can be provided without copying data on tape.

It will be clear from the above embodiments that, if the backup data and its management information are stored in association with each other within the disk array, it is possible to avoid the situation in which the matching relation according to the replacement of the server cannot be maintained when the backup data is stored in the disk array and when its management information is stored in the server, or to prevent the backup data from being unavailable.

Thus, according to the invention, the backup data stored in the disk volume by use of the data mirror function or snapshot function of the disk array can be managed in association with the management information of the backup data in the same way as the backup data stored on the tape.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disk array for use in a computer system having a computer and said disk array comprising:

a plurality of storage regions used by said computer as an external storage; and a processor which executes a disk array control program causing the disk array to perform the steps of:

receiving from said computer a backup command accompanied by information about a first storage region having stored therein data to be backed up within said disk array and information about a second storage region into which said data to be backed up is to be stored as backup data within said disk array, backing up said data of said first storage region into said second storage region in response to said backup command, receiving from said computer at least said information about said second storage region and information about backup of said first storage region, storing at least said information about said second storage region and said information about backup of said first storage region sent as above into a storage region different from said second storage region within said disk array so that both said information can be stored as management information for said backup data, and to be associated with said backup data, and responding to an order from said computer to acquire a list of backup destinations accompanied by said information about said first storage region by sending to said computer said list of backup destinations information about storage regions available as a backup data region for said first storage region, and receiving from said computer said information about said second storage region determined based on said list of backup destinations.

2. A disk array for use in a computer system having a computer and said disk array comprising:

a plurality of storage regions used by said computer as an external storage; and a processor which executes a disk array control program causing the disk array to perform the steps of:

receiving from said computer a backup command accompanied by information about a first storage region having stored therein data to be backed up within said disk array and information about a second storage region into which said data to be backed up is to be stored as backup data within said disk array, backing up said data of said first storage region into said second storage region in response to said backup command, receiving from said computer at least said information about said second storage region and information about backup of said first storage region, storing at least said information about said second storage region and said information about backup of said first storage region sent as above into a storage region different from said second storage region within said disk array so that both said information can be stored as management information for said backup data, and to be associated with said backup data, and responding to an order from said computer to acquire said information about said backup stored in said different storage region, accompanied by information about said different storage region, by sending to said computer said information about said backup stored in said different storage region, wherein said computer stores said received information about said backup.

3. A disk array for use in a computer system having a computer and said disk array comprising:

a plurality of storage regions used by said computer as an external storage; and a processor which executes a disk array control program causing the disk array to perform the steps of:

receiving from said computer a backup command accompanied by information about a first storage region having stored therein data to be backed up within said disk array and information about a second storage region into which said data to be backed up is to be stored as backup data within said disk array, backing up said data of said first storage region into said second storage region in response to said backup command, receiving from said computer at least said information about said second storage region and information about backup of said first storage region, storing at least said information about said second storage region and said information about backup of said first storage region sent as above into a storage region different from said second storage region within said disk array so that both said information can be stored as management information for said backup data, and to be associated with said backup data, receiving from said computer a command to copy said backup data accompanied by information about a third storage region within a disk array different from said disk array, transmitting said data of said second storage region, said information about said third storage region and said management information to said different disk array in response to said command, and storing said data of said second storage region received in said third storage region, and said management information received in a storage region different from said third storage region within said different disk array by said different disk array based on said information about said third storage region so that said management information received can be stored in association with said data stored in said third storage region.

* * * * *